United States Patent [19]

Jaqua

[11] Patent Number: 4,535,518

[45] Date of Patent: Aug. 20, 1985

[54] METHOD OF FORMING SMALL-DIAMETER CHANNEL WITHIN AN OBJECT

[75] Inventor: Vance W. Jaqua, Canoga Park, Calif.

[73] Assignee: Rockwell International Corporation, El Segundo, Calif.

[21] Appl. No.: 533,680

[22] Filed: Sep. 19, 1983

[51] Int. Cl.³ .............................................. B21D 53/00
[52] U.S. Cl. .................................. 29/157 C; 29/424; 29/DIG. 16; 29/DIG. 26; 164/46; 164/91; 204/35.1; 264/317
[58] Field of Search ................. 29/157 R, 157 C, 423, 29/424, 527.6, DIG. 16, DIG. 26; 164/46, 91; 204/35.1; 264/139, 162, 317, 221, 313, DIG. 44; 425/461, 462, 463

[56] References Cited

U.S. PATENT DOCUMENTS

| | | | |
|---|---|---|---|
| 2,433,539 | 12/1947 | Westerman | 29/157 C |
| 2,468,824 | 5/1949 | Hughey | 29/157 C |
| 2,930,115 | 3/1960 | Dietzsch, Sr. et al. | 29/423 |
| 3,595,025 | 7/1971 | Stockel et al. | 29/157 C |
| 3,662,960 | 5/1972 | Mitchell et al. | 239/400 |
| 3,704,499 | 12/1972 | Majkrzak et al. | 29/157 C |
| 3,814,575 | 6/1974 | Cox, Jr. et al. | 431/352 |
| 4,020,543 | 5/1977 | Pennings | 29/423 |
| 4,187,595 | 2/1980 | Kuhn, Jr. | 29/157 C |

FOREIGN PATENT DOCUMENTS 2657474  6/1978  Fed. Rep. of Germany ........ 164/91

*Primary Examiner*—Charlie T. Moon
*Assistant Examiner*—Ronald S. Wallace
*Attorney, Agent, or Firm*—H. Fredrick Hamann; Harry B. Field

[57] ABSTRACT

A method for forming small-diameter, angled ducts and manifolds in a face plate for a rocket-engine injector or the like. A surface of a circular base plate 16 is formed with an annular flange 18 thereon having two inwardly sloping sides 11 and 13. Grooves 20, 22 are machined along the intersections of the sides 11 and 13 with the surface of the base plate 16 for propellant-containing manifolds 36 and 38. Grooves 10 are etched in spaced sets of two down the sloping sides of the flange from the flange top 24 to the manifold grooves 20,22. The grooves 10, 20, 22 are filled with wax 23 and a layer 26 of metal is electrodeposited over the grooved surface of the base plate 16 to cover the top 24 of the flange 18, the deposited layer forming orifice ducts and propellant manifolds from the grooves. This layer 26 is machined down to a depth at which the orifice ducts 34 are exposed so that orifices 12 appear at the surface 30 of the machined layer. The wax 23 is now removed by heat or a solvent.

13 Claims, 5 Drawing Figures

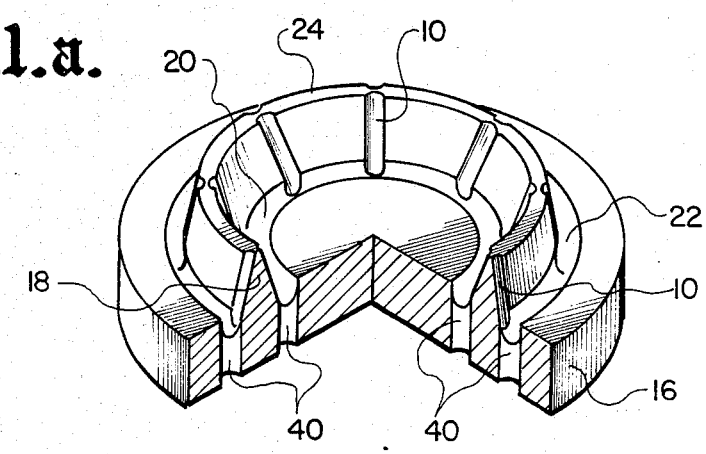
Fig.1.a.
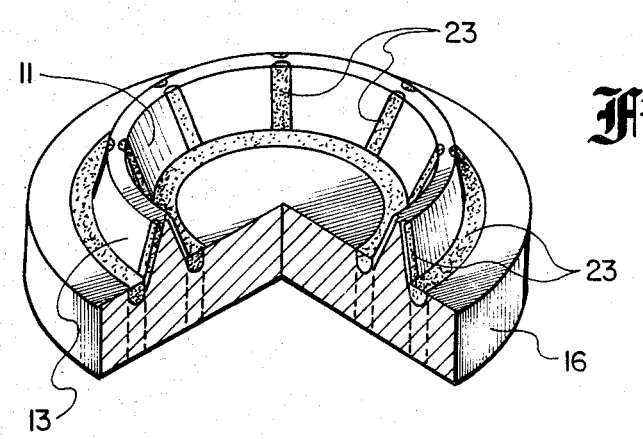
Fig.1.b.
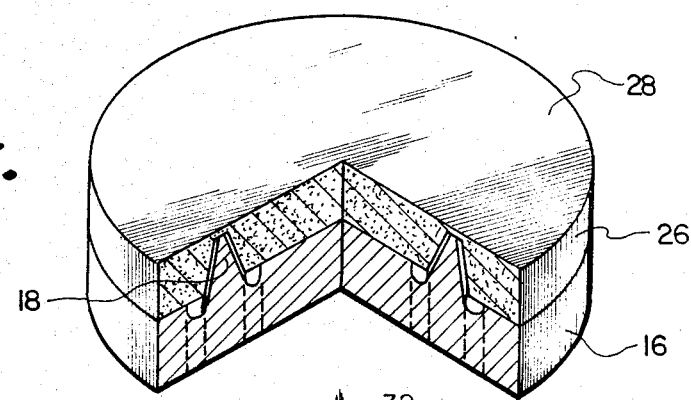
Fig.1.c.
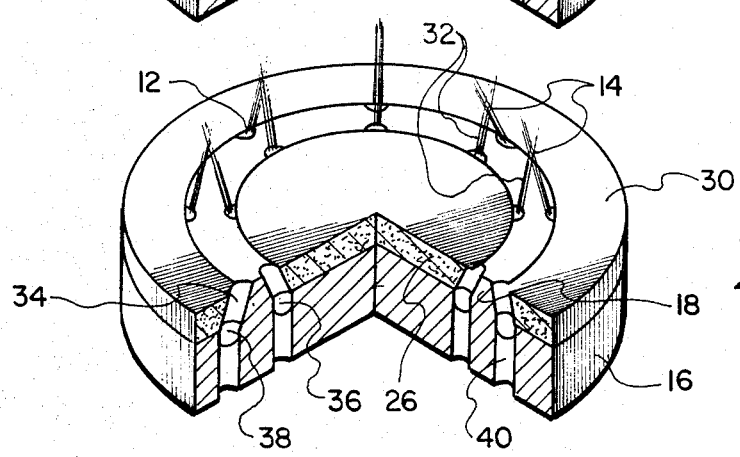
Fig.1.d.

METHOD OF FORMING SMALL-DIAMETER CHANNEL WITHIN AN OBJECT

BACKGROUND OF THE INVENTION

1. Field of the Invention

This invention relates to a process for forming small-diameter channels in an object, and especially to a process for forming manifolds and small-diameter, surface-connected ducts in the face plate of a propellant injector for a rocket engine.

2. Description of the Prior Art

In the operation of rocket engines which employ fluid propellants, especially liquid fuel and oxidizer materials, the propellants are injected into a combustion chamber through the face plate of an injector. The passageways, or ducts, through which the propellants pass through the face plate are quite small in diameter, often under 10 mils. In addition, the ducts are often formed in sets in which the individual ducts are angled so that the injected liquid streams meet at a point, called the impingement point, in the combustion chamber.

Forming the injector face plate with such small ducts and with all ducts having the correct orientation angles presents difficult technical problems and is expensive to accomplish.

OBJECTS OF THE INVENTION

An object of the invention is to provide a simple process for forming surface-connected ducts of small diameter in an object.

Another object is to provide such a process which is relatively inexpensive.

A further object is to provide surface-connected ducts in an object, which ducts have precise angular orientations with respect to each other.

SUMMARY OF THE INVENTION

The objects and advantages of the present invention are achieved by a method for forming narrow, angled, surface-connected ducts within an object. The method comprises forming on a flat surface of the object a prominence, or flange, having sloping sides, forming a groove on each side of the flange where its sloping sides meet the surface, forming sets of grooves on the sloping sides of the flange, filling all grooves with a filler material, forming a bonded layer of material on the surface of the object to cover the top of the flange, removing the top of the layer to uncover the ducts, and removing the filler from the ducts and manifolds.

Other objects, advantages and novel features of the present invention will become apparent from the following detailed description of the invention when considered in conjunction with the accompanying drawing.

BRIEF DESCRIPTION OF THE DRAWINGS

FIGS. 1A-D are cutaway isometric views of the different steps in the process of the present invention.

DETAILED DESCRIPTION OF THE PREFERRED EMBODIMENTS

Figure 2:
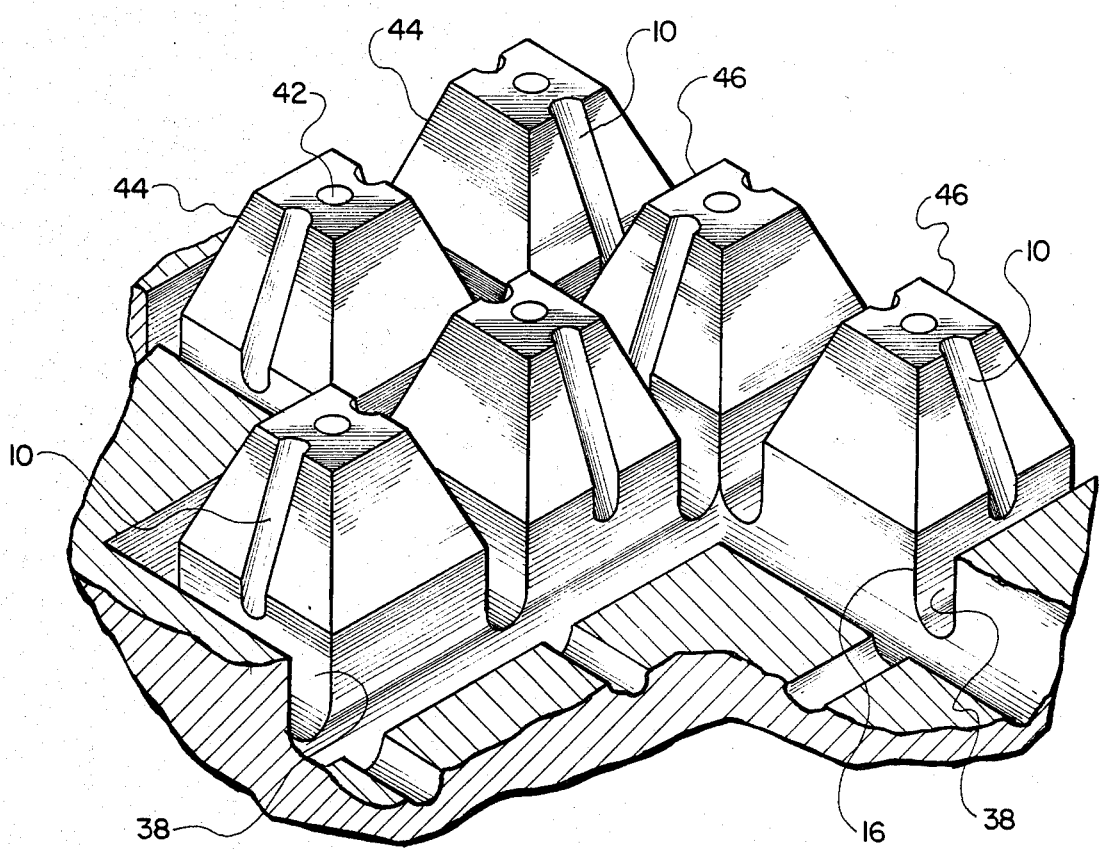
FIG. 2 is a partial isometric view of face plate utilizing pyramidal prominences showing how the grooves may be arranged in accordance with the present invention.

The invention will be described with relation to a plurality of sets of two ducts each, the ducts 10 being angled so that the liquids forced through the orifices 12 of any set of ducts intersect at a common point, the impingement point 14. It is to be understood that the invention encompasses the use of other numbers of ducts per set, different flange configurations and numbers, different orientation angles, and different orifice patterns. Although the invention is described specifically in relation to an injector face plate for a rocket engine, it is obvious that it may be used to fabricate other types of fluid injectors.

If the object to be formed is a face plate of an injector, for example, a circular base plate 16 of stainless steel is commonly employed. The base plate 16 is machined to provide an annular flange 18 whose inwardly sloping sides 11 and 13 (from its base) are oriented at the angles at which the ducts are desired to be oriented. Circular grooves 20 and 22 for fuel and oxidizer manifolds are then machined into the base plate 16 at the two intersection lines of the flange 18 with the surface of the base plate 16. Grooves 10 for orifice ducts 34 to be formed later are now etched in sets of two along the sides of the flange 18 from the manifold grooves 20 and 22 to the top 24 of the flange 18. Any other suitable methods for forming the grooves 20,22 and 10 may be employed.

The manifold grooves 20,22 and the orifice grooves 10 are filled with a subsequently removable filler material such as wax 23 (FIG. 1B). The filler material should be easily removable by melting, or dissolving, or any other suitable means. A layer 26 of a metal, such as Ni, for example, is formed by any suitable process, such as electrodeposition, over the wax-filled surface of the plate 16 (FIG. 1C). The upper surface 28 of the deposited metal layer 26 is then removed, e.g., by milling, to uncover the orifice ducts 10, the openings thereof in the machined surface 30 being known as orifices 12 (FIG. 1D). The wax 23 in the ducts 34 and manifolds 36,38 is now removed by any suitable process, such as melting by heat or dissolving by a solvent.

Bores 40 for connecting the manifolds 36 and 38 to sources of supply for the propellant (fuel and oxidizer) liquids may be drilled in the base plate 16 either before or after the manifold grooves 20 and 22 are formed; however, this is not considered to be part of the method of this invention.

When fuel and oxidizer liquids fill their respective manifolds 20 and 22, pressure applied to the liquids forces them through the ducts 10 and through the orifices 12. The paths of the liquid propellants, once they leave the orifices 12 (along the axes of the ducts), are shown by lines 32 to intersect at the impingement points 14.

Variations of the above method are encompassed within the scope of the invention. For instance, pyramid-like prominences of three or more sides may be used in rows and columns instead of the circular flange 18. FIG. 2 is a partial schematic showing a group of four pyramid-like prominences 44, each having four sides, formed on a base plate 16. A fuel duct 42 is drilled through the flat top 46 of each prominence 44 and connects with a fuel manifold (not shown here) in or below the base plate 16. Oxidizer duct grooves 10, in this case two for each prominence 44, are etched on opposite sides of each prominence 44 and a grid-like network of oxidizer manifold grooves 38 is etched along the intersections of the bases of the prominences 44 and the surface of the base plate 16. The method then proceeds as described with respect to FIGS. 1A-D. As shown, the manifold grooves 38 will intersect to form a grid-like single manifold for the oxidizer. However, manifold grooves 38 could be formed to connect one set of duct grooves 10, and, after a first layer 26 is formed, other manifold grooves 38 could be formed therein to connect the other set of duct grooves 10. The manifolds formed by the two sets of manifold grooves would, of course, be separate manifolds. It is easily seen that three sets of grooves for three different manifolds, or even more, and additional numbers of ducts per set, can be formed by extending the described process.

Obviously, many modifications and variations of the present invention are possible in light of the above teachings. It is therefore to be understood that, within the scope of the appended claims, the invention may be practiced otherwise than as specifically described.

What is claimed and described to be secured by Letters Patent of the United States is:

1. A method for forming channels in an object having at least one flat surface comprising the steps of:
   - forming at least one prominence having at least two tapered sides extending outwardly from said surface;
   - forming two manifold grooves, one at the intersection of each side with said surface;
   - forming a duct groove on each tapered side extending from the top of the prominence to the manifold groove at its base;
   - filling the grooves with a removable filler material;
   - forming a layer of material over said surface to cover the top of said prominence, said layer forming a bond with said surface, whereby a manifold and a duct are formed from said manifold groove and said each duct groove, respectively;
   - removing a portion of said layer to a depth sufficient to uncover said ducts; and
   - removing said filled material from said manifold and ducts.

2. A method as in claim 1, wherein:
   said tapered sides are formed at nonperpendicular angles to said surface such that the axes of said ducts intersect at a point outside the suface of said layer after said portion is removed.

3. A method for forming channels in an object having at least one flat surface, comprising the steps of:
   - forming a prominence on said surface, said prominence having at least one sloping side extending outwardly from said surface;
   - forming a manifold groove at the intersection of the prominence and said surface;
   - forming a duct groove on said sloping side from the top of said prominence to the manifold groove;
   - filling the grooves with a removable filler material;
   - forming a layer of material over said surface to cover the top of said prominence, said layer forming a bond with the surface of said object, whereby a manifold and a duct are formed from said manifold groove and said duct groove, respectively;
   - removing a portion of said layer to a depth sufficient to uncover said duct; and
   - removing said filler material from said manifold and duct.

4. A method as in claim 3, wherein:
   said sloping side forms a non-perpendicular angle with said surface.

5. A method as in claim 3, wherein:
   said flat surface is formed with a plurality of said prominences, a duct groove being formed on the sloping side of each prominence, and said manifold groove being connected with each said duct groove.

6. A method as in claim 3, wherein:
   said prominence comprises a flange having two tapered sides sloping inwardly from the base at which the flange is attached to said surface,
   each said tapered side being formed with a duct groove opposite the other duct groove, in such manner that, when said portion of said layer is removed, the axes of the ducts intersect at a point outside the remainder of the layer.

7. A method as in claim 3, wherein:
   said prominence comprises a flange having two tapered sides sloping inwardly from the base at which the flange is attached to said surface,
   said tapered sides being formed with spaced sets of two duct grooves each, one on each tapered side, in such manner that, when said portion of said layer is removed, the axes of the two duct grooves in each set intersect at a point outside the surface of the remainder of said layer.

8. A method as in claim 7, wherein:
   said flange is annular and is in a substantially medial position on said surface.

9. A method as in claim 7, wherein:
   said filler material is a wax.

10. A method as in claim 7, wherein:
    said filler material is a wax and said layer is formed by electrodeposition.

11. A method for forming a face plate for a liquid injector having a base plate comprising the steps of;
    - forming an annular flange in a medial position on a flat surface of said base plate, said flange having two tapered sides extending outwardly and sloping inwardly form said surface;
    - forming a manifold groove along the intersection of each sloping side with said surface;
    - forming spaced sets of two duct grooves each along said flange, one duct on each sloping side so that the ducts lie opposite each other;
    - filling all grooves with a removable filler material;
    - forming a layer of material over said surface to cover the top of said flange, said layer forming a bond with said surface, whereby manifolds and ducts are formed from said manifold and duct grooves, respectively;
    - removing a portion of said layer to a depth sufficient to uncover said ducts, the axes of the two ducts in each set intersecting at a point outside the surface of the remainder of said layer; and
    - removing said filler material from said manifolds and ducts.

12. A method as in claim 11, wherein:
    said base plate, layer, and flange are fabricated from metals.

13. A method as in claim 12, wherein:
    said filler material is a wax and said layer is formed by electrodeposition.

* * * * *